United States Patent [19]

Erickson et al.

[11] 4,442,696
[45] Apr. 17, 1984

[54] CALIBRATION FAULT DETECTOR AND AUTOMATIC CALIBRATOR

[76] Inventors: Lowell H. Erickson, 1495 S. Steele St., Denver, Colo. 80210; Marcellus S. Merrill, 678 Lafayette, Denver, Colo. 80218

[21] Appl. No.: 129,269

[22] Filed: Mar. 10, 1980

[51] Int. Cl.³ .............................................. G01C 25/00
[52] U.S. Cl. .......................................... 73/1 E; 33/203
[58] Field of Search ...................... 33/203.18, 288, 336, 33/337, 203, 203.13.203.12, 203.14; 73/1 E, 1 R, 1 D, 1 J

[56] References Cited

U.S. PATENT DOCUMENTS

| | | | |
|---|---|---|---|
| 2,782,626 | 2/1957 | Jochum et al. | 73/1 E |
| 3,576,124 | 4/1971 | O'Connor | 73/1 E |
| 3,963,352 | 6/1976 | Rishovd et al. | 33/336 |
| 4,204,333 | 5/1980 | van Blerk | 33/336 |

*Primary Examiner*—William D. Martin, Jr.

[57] ABSTRACT

A fault detecting and automatic calibrating apparatus is provided for monitoring the position of a monitored apparatus. The calibrating apparatus detects errors and corrects the errors during its monitoring operation. In one embodiment, the monitored apparatus is a wheel alignment testing apparatus which checks a front wheel suspension system for proper alignment. The wheel aligner is simultaneously moveable about both a vertical axis and a horizontal axis. The movements of the wheel aligner are detected by transducers which provide angle signals corresponding to a toe angle and a camber angle of a wheel being tested. The calibrating apparatus checks the magnitude of the angle signals whenever a control circuit outputs a target pulse indicating that the toe angle or camber angle of the wheel is at predetermined angles. The predetermined angles are conveniently selected at zero degrees and a positive one degree. If the magnitude of the toe angle signal or camber angle signal does not correspond to a positive one degree toe or a positive one degree camber, upon occurrence of the target pulse, a visual indication is provided by the calibrating apparatus indicating that the apparatus is not properly calibrated. If the magnitude of the toe angle signal or camber angle signal does not correspond to zero degress toe or zero degrees camber, upon occurrence of the target pulse, the calibrating apparatus automatically recalibrates itself so that the angle signal is adjusted to correspond to the actual zero angle of the wheel.

25 Claims, 23 Drawing Figures

Fig_2A

Fig_2B

TARGET

*Fig_7A*

OP-AMPS 46, 52 OUTPUT

*Fig_7B*

COMPARATOR 58 OUTPUT

*Fig_7C*

DATA INPUT OF FLOP-FLOP 104

*Fig_7D*

CLOCK SIGNAL

*Fig_7E*

$\bar{Q}$ OUTPUT FLIP-FLOP 104

*Fig_7F*

DIFFERENTIATING CIRCUIT 108 OUTPUT

*Fig_7G*

INPUT TO NAND GATE 110

*Fig_7H*

CALIBRATION FAULT DETECTOR AND AUTOMATIC CALIBRATOR

TECHNICAL FIELD

The present invention relates to fault detecting and self calibrating devices and, in particular, to an apparatus and a method for detecting when a wheel angle measuring apparatus is not properly calibrated and for correcting the calibration error.

BACKGROUND ART

There are a variety of instruments used to measure predefined parameters. Many of these instruments are calibrated after assembly and tested for proper calibration by using a test sample which has known parameters. The parameters of the test sample are measured by the instrument. If properly calibrated, the instrument provides an indication of the known parameters. If not properly calibrated, the instrument outputs data different than the known parameters. The measuring instrument can then be manually calibrated to correctly reflect the known parameters.

A testing apparatus which includes a measuring system is disclosed in U.S. Pat. No. 3,187,440 to Merrill et al. entitled "Dynamic Wheel Alignment Testing Apparatus." The wheel aligner described therein automatically checks and measures specified interrelated angles which are pertinent to aligning the front wheel suspension system of a vehicle. Among such angles, toe in is defined as the inward slanting of the wheels toward the front while camber is defined as the inward sloping of the wheels toward the bottom. The caster and kingpin inclinations are mathematically related to the camber angle of the wheel. The measuring system provides a visual indication of each of the relevant inclinations; however, it is assumed that the measuring system is properly calibrated prior to determining the various angles. That is to say, it is expected, if the toe display meter indicates an angle of zero degrees, that there is no inward slanting of the wheels toward the front. However, if signals from the electronics circuitry which control meter movement are altered or have drifted from initial reference levels, the toe display meter may register a value other than zero degrees even though the angle should provide a reading of zero degrees. Such discrepancies between the visual meter indication and the actual angles pertinent to the front wheel suspension system result in the determination of inaccurate wheel alignment data and the making of incorrect wheel alignments.

SUMMARY OF THE INVENTION

The present invention is directed to an apparatus for minimizing inaccurate measurements and, more specifically, to minimizing calibration errors in a calibration fault detecting and automatic calibrating apparatus which is responsive to a monitored apparatus. From the following discussion, it will be readily appreciated that the present invention can be used in combination with a number of monitored apparatus. For example, the automatic calibrating apparatus described herein could be used to minimize inaccurate lathe machine positions so that the machine properly works material in a predefined manner. In the embodiment described herein, the present invention is used in combination with a wheel aligning apparatus for minimizing the occurrence of inaccuracies when measurements are made of the various interrelated angles which are significant in a front wheel suspension system. If an angle measurement is provided which is incorrect in view of the sensing of a preestablished reference angle or position, the apparatus of this invention provides a visual indication that this measurement is inaccurate. Based on this indication, an operator can recalibrate the apparatus so that the angle provided and displayed on a meter corresponds to the actual angle of the wheel being measured. With regard to measurement errors in which a measurement other than zero degrees is given when the toe angle or camber angle of a wheel is actually at zero degees, the apparatus of this invention automatically recalibrates or corrects itself provided that the error or discrepancy is within predetermined limits.

The apparatus of the present invention includes transducers which simultaneously provide angle signals representative of the toe angle and camber angle of the vehicle wheel. Each of the angle signals is outputted to a checking circuit and subsequently gated to a meter display which provides a visual indication of the toe and camber angles of a wheel as it is dynamically tested. When the wheel alignment testing apparatus passes through points indicative of zero degrees toe or camber, a control circuit sends a zero target pulse to a checking circuit. The checking circuit makes a determination as to whether the angle signal matches a predetermined output indicative of the zero degree toe or zero degree camber. If there is not a substantial match, the checking circuit outputs a signal for controlling an adjusting circuit. The adjusting circuit outputs a correcting signal for adjusting the angle signal so that the angle signal corresponds to the actual zero degree value of the toe or camber angle. As a consequence, each meter display for the toe and camber angles is corrected so that it corresponds to the actual angle and the actual position of the wheel as determined by a reference circuit which monitors the position of the wheel aligning apparatus and the wheel being tested. The control circuit also sends a target pulse to an enabling circuit which provides a visual indication as to whether the transducer outputs and meter display correspond to the actual zero degrees value of the toe angle or camber angle.

The apparatus of the present invention also checks for proper calibration at a toe angle and a camber angle other than zero degrees and which is defined as the range point. Conveniently, an angle of a positive one degree is chosen for the range point. The control circuit provides a positive one target pulse each time either the toe angle or camber angle has a value of a positive one degree as determined by the reference circuit which monitors the position of the wheel aligning apparatus. The positive one target pulse is gated to an enabling circuit for providing a visual indication as to whether or not the angle signals, corresponding to the sensed toe or camber angle, match the actual one degree angle for the toe or camber of the wheel as provided by the reference circuit.

More particularly, an automatic calibrating apparatus is provided for use in combination with an apparatus which is being monitored thereby, such as a wheel alignment testing apparatus. The automatic calibrating apparatus of this invention includes a reference circuit having a target which is moveably positioned such that, whenever the wheel aligner passes through points corresponding to an angle of zero degrees or one degree for toe or camber, a change in a target signal outputted from the reference circuit occurs. Provided that an angle signal is within predetermined limits, a control circuit then produces a target pulse from a flip-flop arrangement. The angle signal corresponds to the measured toe angle or camber angle of the wheel being tested. The angle signals outputted by transducers which monitor the position of the wheel aligning apparatus are gated to a checking circuit. When the change in the target signal from the reference circuit is indicative of a zero or positive one toe angle or a zero or positive one camber angle, the sample and hold circuit latches the angle signal for a predetermined time period. When the change in the target signal is indicative of a zero degree toe or camber and if the angle signal does not correspond to a zero degree value, a correcting signal is generated by an adjusting circuit. The adjusting circuit includes an up/down digital counter enabled by a control circuit target pulse. The digital counter outputs a digital signal indicative of the magnitude of the error in the angle signal. This digital signal is inputted to a digital-to-analog converter which outputs a correcting signal. The correcting signal is applied to a summing amplifier in the checking circuit, together with the angle signal, so that the output of the summing amplifier is a corrected angle signal corresponding to the actual zero degrees toe angle or camber angle.

If the target pulse from the control circuit is generated because the wheel aligning apparatus and the wheel being tested are passing through a range point of one degree toe or one degree camber, the digital counter is not enabled. But this positive one degree target pulse is gated to an enabling circuit and indicators, such as light emitting diodes (LEDs), which output an indication of whether the actual range point of one degree as provided by the reference circuit equals the value of the corrected angle signal. Similarly, after the correcting signal is generated by the adjusting circuit and summed with the angle signal, the zero degree target pulse permits the enabling circuit to provide an indication of whether the corrected angle signal corresponds to zero degrees toe or zero degrees camber as indicated by the reference circuit.

From the foregoing description, a number of worthwhile advantages of the present invention are readily discerned. A fault detecting and automatic calibrating apparatus is provided for use in combination with a monitored apparatus. The calibrating apparatus checks and measures the position of the monitored apparatus and determines whether the measured position corresponds to a preestablished reference position of the monitored apparatus. If there is a lack of correspondence, the calibrating apparatus adjusts itself so that the measured position does correspond. Furthermore, the calibrating apparatus provides a visual indication as to whether the calibrating apparatus is properly calibrated at two separate points corresponding to two different positions of the monitored apparatus. As a consequence, if a correspondence results at the first position of the monitored apparatus but is not present at the second position, an indication thereof is provided so that the calibrating apparatus can be corrected. As a result of these features, correct measurements of the position of the monitored apparatus are provided.

In the embodiment described herein, the fault detecting and automatic calibrating apparatus responds to a wheel aligning testing apparatus. If the calibrating apparatus determines that an angle signal representative of the toe or camber angle of a wheel being tested is different than a predetermined output when the alignment tester passes through preestablished reference positions indicative of zero degrees toe or zero degrees camber, the apparatus corrects the angle signal so that a proper indication of zero degrees is given on a meter display. If the angle signal is not properly corrected when the alignment tester is at zero degrees toe or camber, an indication is provided that the apparatus is not in proper calibration and should be manually calibrated before continuing with the alignment procedure. Similarly, if the calibrating apparatus determines that the toe angle or camber angle as represented by the angle signals does not correspond to a positive one degree, an indication thereof is provided so that an operator can properly service the calibrating apparatus. These features greatly minimize the possibility of inaccurate wheel alignment data being taken. Hence, unwarranted alignment changes are not made. Furthermore, when the calibrating apparatus is used in facilities which record the various interrelated wheel angles, the recordings satisfactorily reflect the actual toe and camber angles and do not include errors resulting from improper apparatus calibration.

DESCRIPTION OF THE PREFERRED EMBODIMENT

Figure 1:
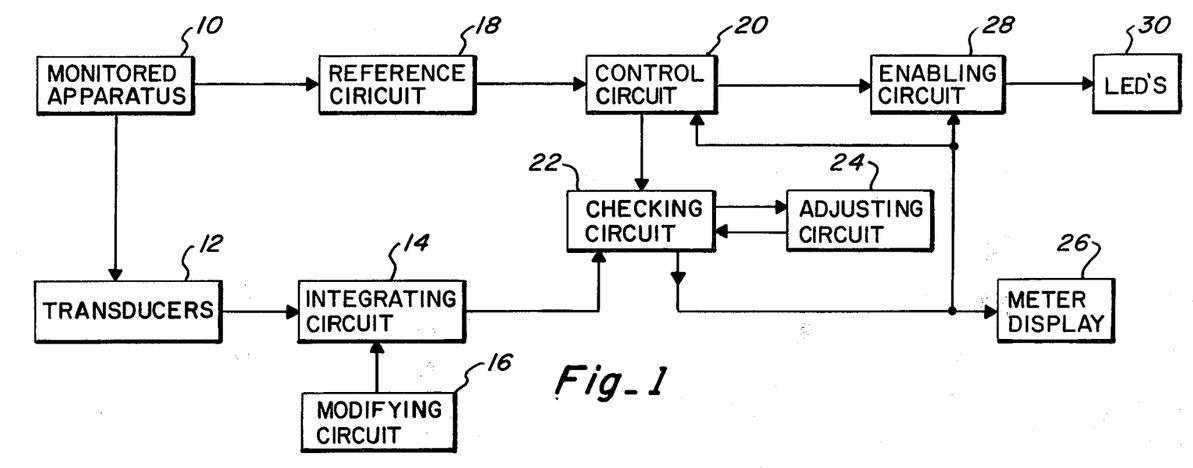
FIG. 1 is a block diagram of the present invention connected to a monitored apparatus.

Referring initially to FIG. 1, a block diagram of the present invention is provided. A monitored apparatus 10 is monitored by the fault detecting and automatic calibrating apparatus. The monitored apparatus 10 can include a number of different apparatus. In the embodiment described in detail herein, the monitored apparatus is a wheel aligning testing apparatus. However, it is readily understood that the fault detecting and automatic calibrating apparatus is not confined to use therewith. The monitored apparatus can be a latherelated machine in which the fault detecting and automatic calibrating apparatus is used to minimize inaccuracies in the working of materials by the machine. The monitored apparatus could also be further defined as a light beam, such as a laser beam, in which the position thereof at predetermined time periods is a salient feature for proper operation. Consequently, it can be appreciated that, although the present invention will be described in relation to a wheel alignment testing apparatus, its use is not limited thereto.

The monitored wheel aligning apparatus 10 moves simultaneously about both a horizontal axis and a vertical axis in response to forces applied by a wheel being tested by the apparatus 10. The apparatus 10 is the aligning apparatus disclosed in U.S. Pat. No. 3,187,440 to Merrill et al. Transducers 12 monitor the movement of the wheel aligning apparatus 10. A first transducer monitors the toe angle of the wheel and provides a signal indicative of the toe angle while a second transducer monitors the camber angle of the wheel and provides a signal indicative of the camber angle. Toe-in is generally defined as the inward slanting of the vehicle wheel toward the front. Camber is generally defined as the inward sloping of the wheel toward the bottom. The transducers 12 are linear variable differential transducers (LVDTs) which provide an AC signal. The amplitude of the AC signal is proportional to the displacement of the core of the transducer 12 from a null or zero point. The greater the distance the wheel aligning apparatus 10 is from the zero toe angle or zero camber angle, the greater in absolute magnitude is the AC signal. Each transducer is mechanically adjustable in order to match the null point of the transducer with the zero angle position of the wheel aligning apparatus 10. As a consequence, when the monitoring transducers 12 output a signal corresponding to a zero degree toe or camber, the monitored wheel aligning apparatus 10 is physically positioned at a zero degree toe or a zero degree camber. Each signal representing the toe angle or camber angle of the wheel is amplified, rectified and integrated by an integrating circuit 14. Integrating circuit 14 outputs an angle signal corresponding to the toe angle or camber angle of the wheel. Further assurance that the toe or camber angle signals correspond to the actual position of the wheel aligning apparatus 10 is provided by the modifying circuit 16. When the monitored wheel aligning apparatus 10 is located at zero degrees toe angle and zero degrees camber angle, the modifying circuit 16 adjusts each transducer signal so that an angle signal corresponding to zero degrees toe or zero degrees camber is outputted by the integrating circuit 14. In addition to modifying the transducer signal at zero degrees toe or camber, the modifying circuit 16 also permits each transducer signal to be adjusted so that it corresponds to a wheel aligning apparatus position of a positive one degree toe or camber. This one degree position is defined as the range point.

A reference circuit 18 also separately monitors the position of the wheel aligning apparatus 10. A target signal is outputted by the reference circuit 18. Each time the wheel aligning apparatus 10 passes through a point corresponding to zero degrees toe angle or zero degrees camber angle, the magnitude of the target signal changes. The target signal is inputted to a control circuit 20. The angle signal from integrating circuit 14, representing the toe angle or camber angle, is gated to a checking circuit 22. The checking circuit 22 in conjunction with an adjusting circuit 24 corrects the angle signal so that it properly reflects the position of the wheel aligning apparatus 10. The checking circuit 22 outputs a corrected angle signal corresponding to the actual toe angle or camber angle of the wheel. This corrected angle signal is applied to the control circuit 20. Each time the target signal changes in magnitude when the wheel aligning apparatus 10 is at zero degrees or a positive one degree and the magnitude of the corrected angle signal is within predetermined limits, a target pulse is generated by the control circuit 20. A zero target pulse defines the presence of the wheel aligning apparatus at a reference position indicative of a zero degree toe angle or zero degree camber angle. A range target pulse defines the presence of the wheel aligning apparatus 10 at a reference position indicative of a positive one degree toe angle or a positive one degree camber angle. Two different preestablished reference angles or positions are checked to minimize inaccuracies which may occur when the toe or camber angle signal does correspond to a first preestablished reference position but does not correspond to a different preestablished reference position.

Each target pulse is applied to the checking circuit 22. A sample and hold circuit in the checking circuit 22 responds to the target pulse so that the angle signal has adequate time to be corrected by the adjusting circuit 24. The adjusting circuit 24 is enabled by the zero target pulse. When the zero target pulse is present and the angle signal output of checking circuit 22 does not substantially correspond in magnitude to a predetermined output or reference voltage signal, the adjusting circuit 24 generates a correcting signal to compensate for this lack of correspondence. The correcting signal is fed back to the checking circuit 22 to correct the angle signal inputted thereto. During the time period in which no zero target pulse is present, the adjusting circuit 24 continuously inputs the previously generated correcting signal to the checking circuit 22. Upon the occurrence of the next zero target pulse, the adjusting circuit 24 generates an updated correcting signal when the magnitude of the angle signal does not match the reference voltage signal. The corrected angle signal is also applied to a meter display 26. The meter display 26 provides a visual indication of the toe angle or camber angle of the wheel being tested.

Each target pulse and each of the toe and camber angle signals are also applied to an enabling circuit 28. At the occurrence of each target pulse and when the toe or camber angle signal corresponds to zero degrees or a positive one degree, one of the light-emitting diodes (LEDs) 30 turns on or is lit for a short predetermined period of time. If the toe angle or camber angle signal does not correspond to zero degrees or a positive one degree, the LED 30 remains continuously lit. As a consequence, an operator can readily determine whether the fault detecting and automatic calibrating apparatus is properly calibrated so that an accurate display of the toe angle or camber angle of a wheel being tested is provided.

The various circuits comprising this invention are illustrated in FIGS. 2–6. The reference circuit 18 is depicted in FIGS. 2A and 2B. The reference circuit 18 is provided to monitor the toe angle of the wheel being tested and another reference circuit 18 is provided to monitor the camber angle of the wheel being tested. The reference circuit 18 includes a target 32 which is connected to the monitored wheel aligning apparatus 10. The target 32 is movable together with the monitored wheel aligning apparatus 10 as it responds to wheel forces being applied thereto. The target 32 includes a high light reflecting surface and a surface which has a low light reflecting capability. As can be seen in FIG. 2B in the preferred embodiment, the target 32 includes alternating surfaces of high light reflection 34 and low ight reflection 36. A pair of photosensors 38, 40 are fixedly mounted adjacent the path of movement of the target 32, approximately 1/16th of an inch therefrom. The transition points at which the surface of the target 32 changes from high light reflecting to low light reflecting are formed for corresponding to preestablished reference positions of the monitored wheel aligning apparatus 10. The transition points are formed for correspondence with the zero degrees, positive one-half degree, and positive one degree toe or camber angle of the monitored wheel aligning apparatus 10.

Figures 2A, 2B:
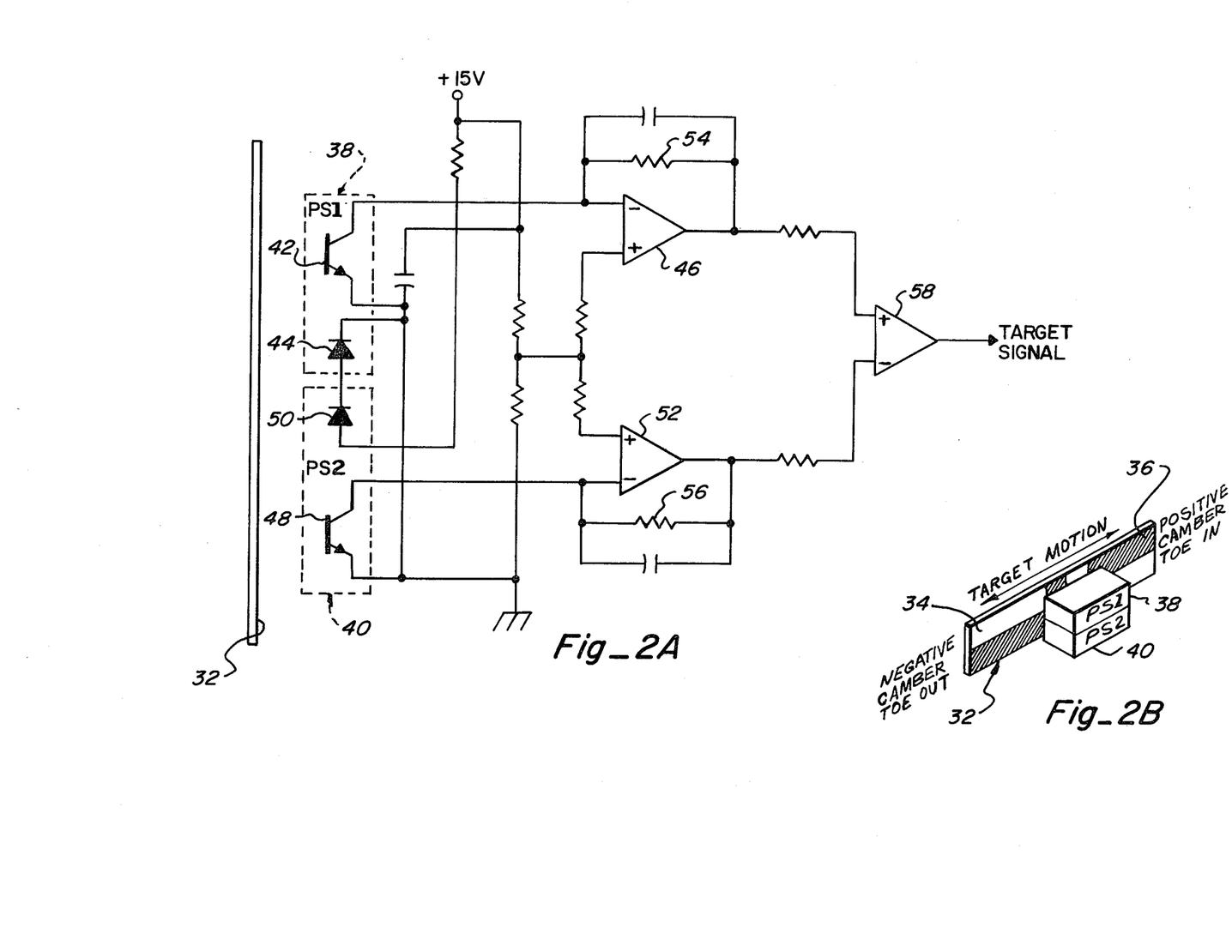
FIG. 2A is a schematic of the reference circuit including the target for connection to the monitored apparatus.
FIG. 2B is a perspective view of the target and photosensors showing the high light reflecting surfaces and the low light reflecting surfaces of the target.

As the target 32 moves from a negative camber or toe out angle toward a positive camber or toe in angle, phototransistor 42 of photosensor 38 is turned on by the light emitted from LED 44. The light from LED 44 is directed against and reflected by surface 34 of target 32. The increased current through phototransistor 42 results in a voltage defined as a logic HIGH at the output of operational amplifier 46 since its voltage output is proportional to the current through phototransistor 42. During the time phototransistor 42 is turned on, phototransistor 48 of photosensor 40 is essentially cut off since the light emitted by LED 50 is not reflected by the low light reflecting surface 36. Hence, the voltage output of operational amplifier 52 is at a voltage defined as at a logic LOW.

When the monitored wheel aligning apparatus 10 and the target 32 are moved to the zero degree toe or camber position, the current through phototransistor 42 diminishes since the target transition point is across from the photosensors 38, 40 and the low light reflecting surface 36 is now across from LED 44. Consequently, the voltage output of operational amplifier 46 becomes a logic LOW. Conversely, phototransistor 48 turns on so that the voltage output of operational amplifier 52 increases. When the target 32 reaches the one-half degree position, the output voltages of the operational amplifiers 46, 52 again switch states. The output of operational amplifier 46 becomes a logic HIGH while the output of operational amplifier 52 becomes a logic LOW. Similarly, the outputs of the operational amplifiers 46, 52 switch states at a positive one degree toe angle or camber angle position. FIG. 7B illustrates the signal levels of the operational amplifiers 46, 52 during the movement of target 32 from a negative camber or toe in angle to a positive camber or toe out angle. It is apparent that if feed back resistors 54, 56 are identical in value, the output voltages of the operational amplifiers 46, 52 will be equal at the transition points of zero degrees, a positive one-half degree, and a positive one degree.

Two photosensors 38, 40 are provided to minimize any effects that electronic signal changes or signal drifts may produce. For example, the LEDs 44, 50 are connected in series so that any current change will be experienced in both LEDs. As a consequence and assuming that phototransistors 42, 48 have substantially the same characteristics, the current through the phototransistors 42, 48 will change accordingly. Since the occurrence of each transition point is determined by the matching of voltage outputs of operational amplifiers 46, 52 and not their absolute voltage magnitudes, the change in current does not affect the sensing of the transition points. In addition, the zero degree and positive one degree transition points of the target 32 are formed such that their direction of change is the same. That is to say, the output voltage of operational amplifier 46 changes from a logic HIGH to a logic LOW at both the zero degree and positive one degree transition point, as can be seen from FIG. 7B. Conversely, the output voltage of operational amplifier 52 changes from a logic LOW to a logic HIGH at both of these transition points. The occurrence of the zero degree and positive one degree target transitions are subsequently used in other circuits of the fault detecting and automatic calibrating apparatus. As a consequence, in order to further minimize the effects of electronic signal drift, the output voltages of operational amplifiers 46, 52 at these two transition points will be substantially the same.

The output of operational amplifier 46 is applied to the non-inverting terminal of comparator 58. The output of operational amplifier 52 is applied to the inverting terminal of comparator 58. Comparator 58 outputs a target signal which changes in magnitude in response to the changes in the voltage outputs of operational amplifiers 46, 52. As illustrated in FIG. 7C, the target signal changes from a logic HIGH to a logic LOW at the zero degree transition point. Similarly, the target signal output of comparator 58 changes from a logic HIGH to a logic LOW at the positive one degree transition point. The target signal changes from a logic LOW to a logic HIGH at the positive one-half degree transition point.

Figure 3:
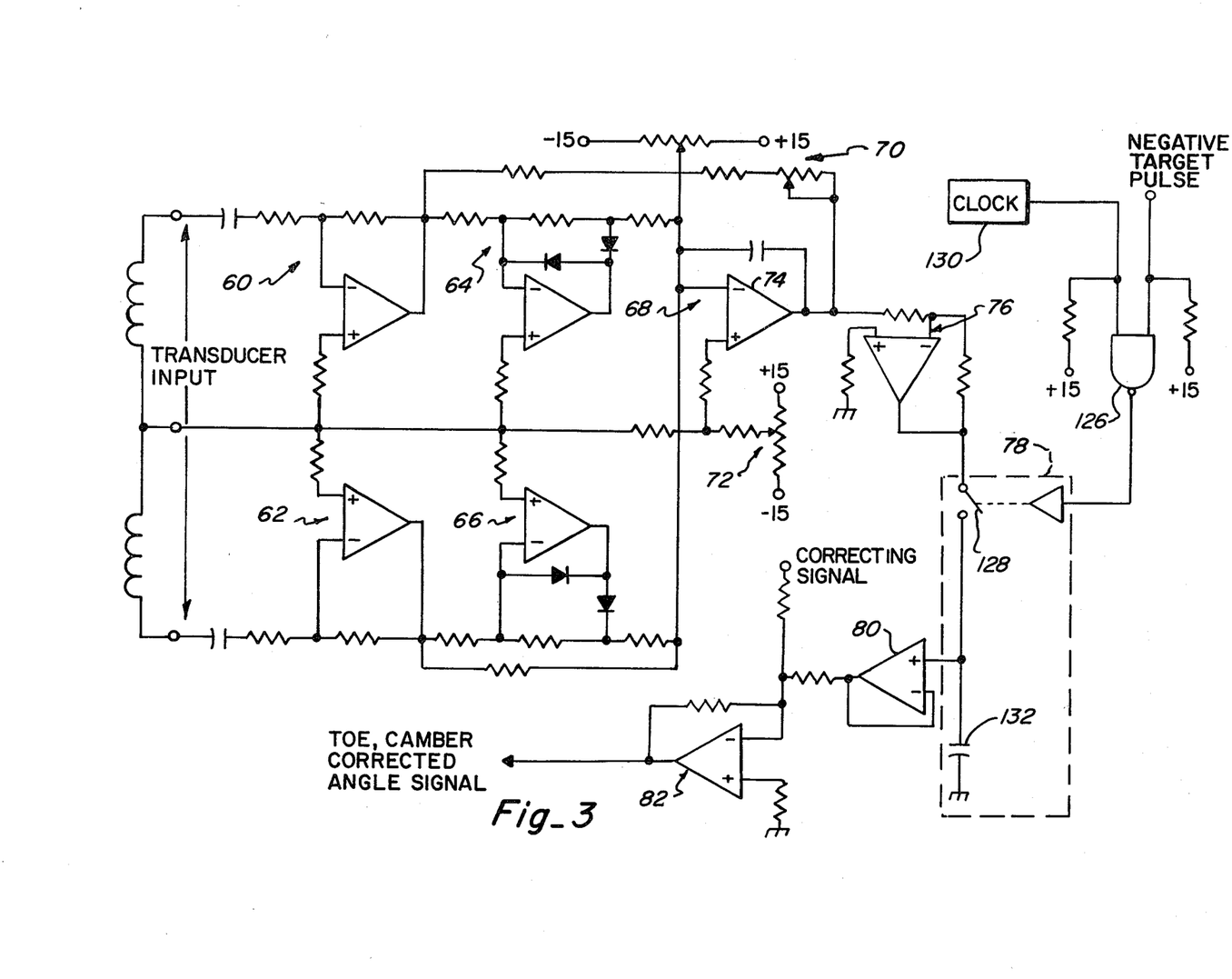
FIG. 3 is a schematic showing the integrating circuit and checking circuit.

In addition to the reference circuit 18 monitoring the position of the wheel aligning apparatus 10, the transducers 12 generate a signal indicative of the toe angle or camber angle of the wheel. One transducer 12 monitors the toe angle while a second transducer monitors the camber angle. The displacement of the transducer core is a function of the position of the wheel aligning apparatus 10. As can be seen in FIG. 3, each transducer signal is inputted to individual amplifying networks 60, 62. Both amplifying networks 60, 62 receive an AC signal whose amplitude is proportional to the displacement of the transducer core. The amplitude of the AC signal inputted to the amplifying network 60 and the amplitude of the AC signal inputted to the amplifying network 62 are substantially equal when the wheel aligning apparatus is at zero degrees toe angle or zero degrees camber angle. As the wheel aligning apparatus 10 moves away from the zero degree positions, the amplitude of the signal applied to the amplifying network 60 changes inversely with respect to the amplitude of the signal applied to the amplifying network 62. That is, when the wheel aligning apparatus 10 is moved towards a positive camber or toe in, the amplitude of the signal inputted to amplifying network 60 increases while the amplitude of the signal inputted to amplifying network 62 decreases. When the wheel aligning apparatus is moved towards a negative camber or toe out, the amplitude of the signal inputted to amplifying network 60 decreases while the amplitude of the signal inputted to amplifying network 62 increases.

The outputs of amplifying networks 60, 62 are applied to rectifying circuits 64, 66, respectively. The output of rectifying circuit 64 is a negative signal while the output of rectifying circuit 66 is a positive signal. The rectified signals are summed and this resulting signal is gated to an integrator network 68. Since the amplitudes of the rectified signals from rectifying circuits 64, 66 are opposite in sense or sign, whenever the two rectified signals are equal the input to the integrating network 68 is zero volts. When the two rectified signals are not substantially equal indicating a wheel aligning apparatus 10 position other than zero degrees, a signal equal to the difference between the two rectified signals is generated. The integrating network 68 integrates the summed signal providing an output proportional to the toe angle or camber angle of the wheel. This output is defined as the angle signal.

Modifying circuit 16 is connected to the integrating network 68 and includes trimmer circuits 70, 72. The trimmer circuits are used to adjust the integrating input signal to zero volts when the wheel aligning apparatus 10 is at zero degrees toe angle or zero degrees camber angle. This adjustment is made after the transducers 12 are mechanically adjusted so that each transducer output indicates that the wheel aligning apparatus 10 is at the zero degree position. Trimmer circuit 72 is provided to null out any DC offset voltage that may be present in the integrating network 68 and to electrically adjust the transducer output signals.

The angle signal outputted by the integrating network 68 is applied to an amplifying network 76 of checking circuit 22. There is a checking circuit 22 for detecting the toe angle and another checking circuit 22 for detecting the camber angle. Amplifying network 76 communicates with a sample and hold circuit 78 which gates the amplified angle signal to voltage follower 80. The angle signal is then summed with a correcting signal by summing amplifier 82. The generation of the correcting signal will be fully explained later. The output of the summing amplifier 82 is a corrected angle signal representing the toe angle or camber angle of the wheel in which the electronic signal has been adjusted to match the actual position of the monitored wheel aligning apparatus 10.

Figure 4:
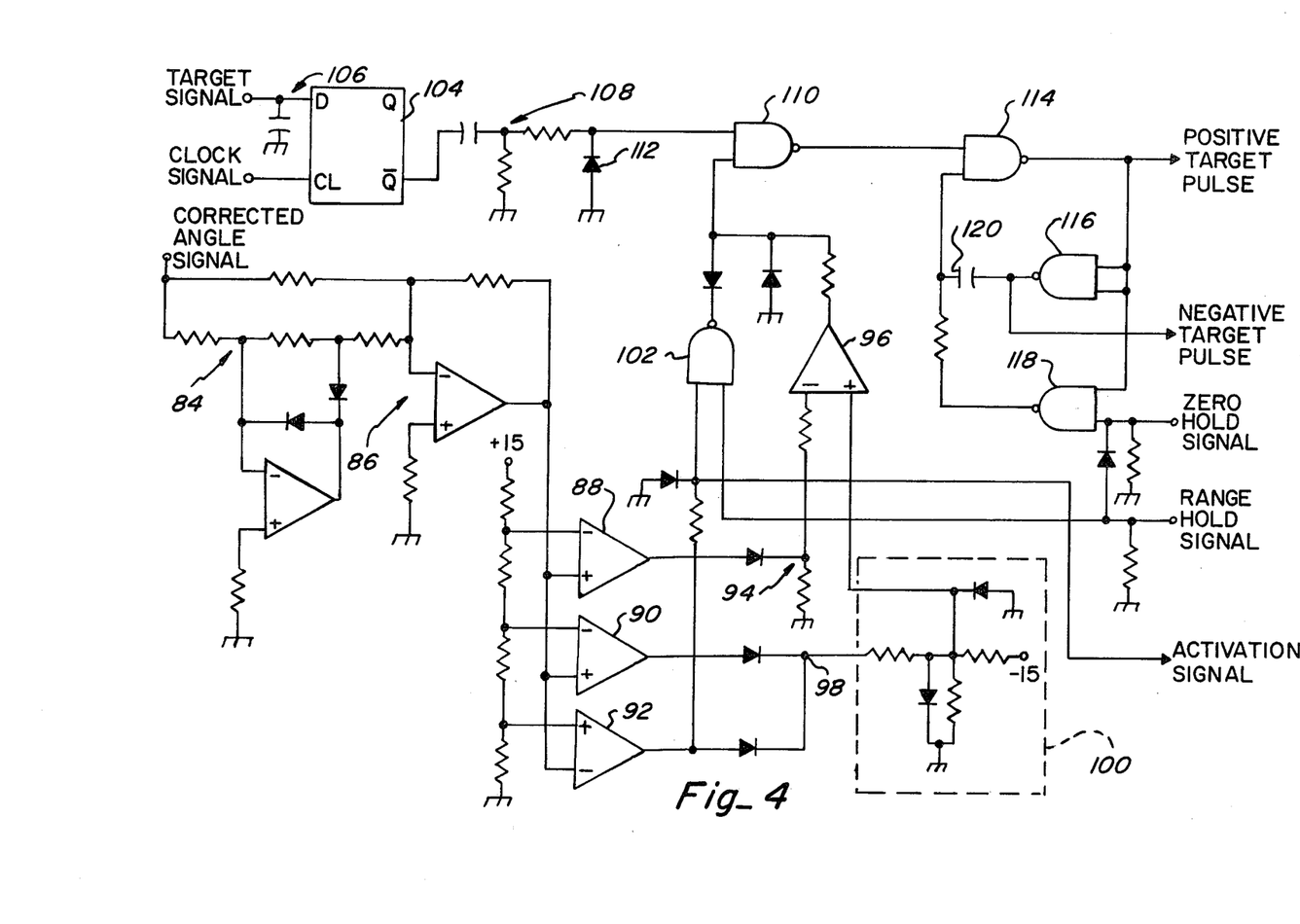
FIG. 4 is a schematic showing the control circuit.
Figure 8A:
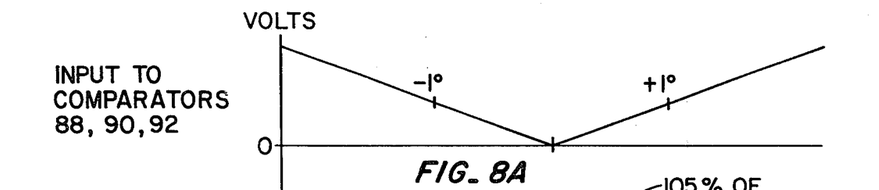
FIGS. 8A–8H illustrate a signal waveform timing diagram associated with the control circuit.
Figure 8B:
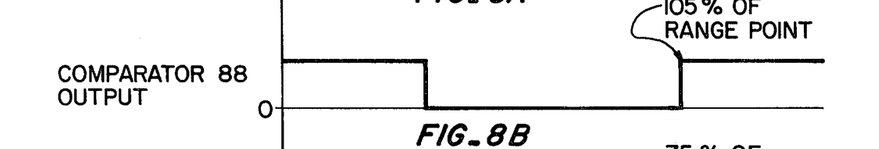
Figure 8C:
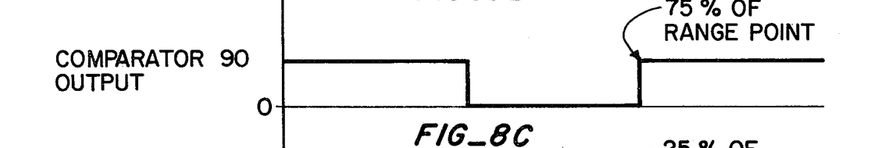
Figure 8D:
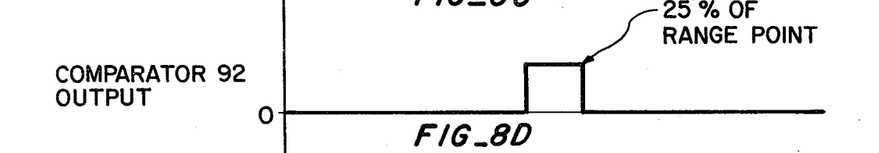
Figure 8E:
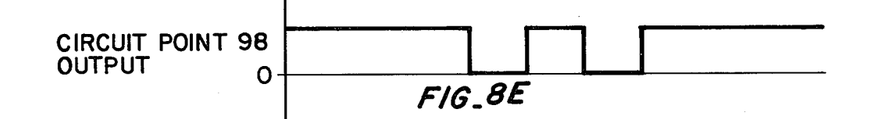
Figure 8F:
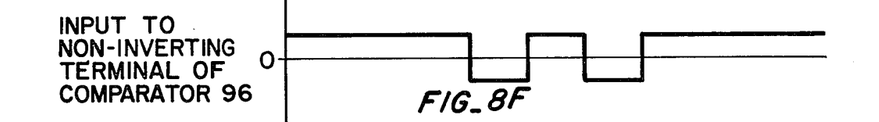
Figure 8G:
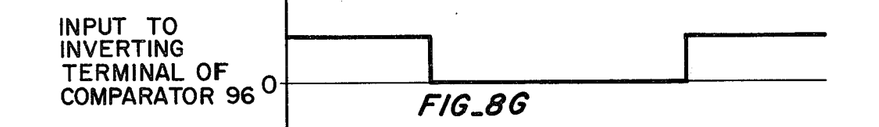

Each of the corrected toe angle and camber angle signals outputted by their respective summing amplifiers 82 is applied to the control circuit 20. It is understood that a separate control circuit 20 is provided for the toe angle signal and for the camber angle signal. Referring to FIG. 4, control circuit 20 includes a full wave rectifying circuit 84 which receives the corrected angle signal from summing amplifier 82. The angle signal is essentially a ramp signal proportional to the displacement of the wheel aligning apparatus 10, as illustrated in FIG. 8A. Although the angle signal is depicted as linear and symmetric about a vertical axis, the angle signal actually comprises a number of minute voltage steps as a result of the latching or holding of the integrated transducer signal by sample and hold circuit 78.

The rectifying circuit 84 rectifies the angle signal so that the resulting ramp signal is V-shaped. Amplifying circuit 86 reverses the polarity of the V-shaped angle signal so that the angle signal is positive throughout its duration. The angle signal representing the toe angle or camber angle of the wheel being measured is then applied to each of three comparators 88, 90, 92. Both first comparator 88 and second comparator 90 are connected at their non-inverting terminals to the angle signal. Third comparator 92 is connected at its inverting terminal to the angle signal. Reference voltages are applied to the inverting terminals of first comparator 88 and second comparator 90. A third reference voltage is applied to the non-inverting terminal of the third comparator 92. The reference voltages to each of the comparators 88, 90, 92 are selected to generally coincide with the voltage signals corresponding to zero degrees, one-half degree, and one degree toe angle or camber angle thereby providing windows at these preestablished angle positions. The outputs of comparators 88, 90, 92 contribute to the controlling of the adjusting circuit 24 and the enabling circuit 28. In addition, the comparators 88, 90, 92 assure that the change in the target signal at the one-half degree position will be inhibited. These features are subsequently discussed in detail.

The reference voltage to the inverting terminal of first comparator 88 provides an input signal corresponding to 105% of the range point voltage. The range point voltage is defined as the voltage corresponding to a one degree toe or camber. The reference voltage to the inverting terminal of second comparator 90 provides an input signal corresponding to 75% of the range point voltage. The reference voltage to the non-inverting terminal of third comparator 92 provides an input signal corresponding to 25% of the range point voltage. When the angle signal is greater than 105% of the range point voltage, the output of first comparator 88 is a logic HIGH, the output of second comparator 90 is a logic HIGH, and the output of third comparator 92 is a logic LOW. The logic HIGH of first comparator 88 is applied to the divider network 94. The divider network 94 communicates with the inverting terminal of comparator 96. The logic HIGH of second comparator 90 and the logic LOW of third comparator 92 are joined at circuit point 98 which provides a logic OR output to the resistive reference network 100 which is tied to the non-inverting terminal of comparator 96. Since the voltage input resulting from the divider network 94 is greater in magnitude than the voltage input resulting from the input applied to the non-inverting terminal of comparator 96 through the resistive reference network 100, a logic LOW is outputted from comparator 96. When the angle signal becomes just less than 105% of the range point voltage, first comparator 88 becomes a logic LOW, second comparator 90 remains a logic HIGH, and third comparator 92 remains a logic LOW. The logic LOW of first comparator 88 is applied to the divider network 94. Since the voltage signal now applied to the inverting terminal of comparator 96 is less in magnitude than that applied to the non-inverting terminal of comparator 96, a logic HIGH is outputted from comparator 96. When the angle signal becomes just less than 75% of the range point voltage, first comparator 88 remains a logic LOW while second comparator 90 becomes a logic LOW. The output of third comparator 92 remains a logic LOW. The logic LOW outputs of second and third comparators 90, 92 provide a logic LOW output at circuit point 98. This logic LOW is applied to the resistive reference circuit 100. The output of the resistive reference circuit 100 communicates with the non-inverting terminal of comparator 96. Since this output is now less in magnitude than the input to the inverting terminal of comparator 96 from divider network 94, comparator 96 again outputs a logic LOW. When the angle signal becomes just less than 25% of the range point voltage which corresponds to a one degree camber angle or a one degree angle, the outputs of comparators 88, 90 remain a logic LOW while the output of comparator 92 becomes a logic HIGH. Circuit point 98 then becomes a logic HIGH also. This logic HIGH through resistive reference network 100 provides a voltage signal to the non-inverting terminal of comparator 96 which is greater in magnitude than the voltage output of the divider network 94. As a consequence a logic HIGH is again outputted from comparator 96. The foregoing comparator input and output signals are illustrated in FIGS. 8A-8G. The output of third comparator 92 is also applied to NAND gate 102 and to the adjusting circuit 24 as an activation signal for purposes to be discussed later.

At the same time the angle signal is inputted to the control circuit 20, the target signal from reference circuit 18 is applied to a "D" flip-flop 104 of control circuit 20 through delay circuit 106 which delays the input to the flip-flop 104 approximately 1 millisecond. A clock signal is applied to the clock input of the flip-flop 104. In the preferred embodiment, the clock signal is a 5 KHZ signal, such as depicted in FIG. 7E. Each time the clock signal rises the compliment of the target signal which is present on the data line of flip-flop 104 is outputted from the compliment output ($\overline{Q}$) of the flip-flop 104 to a differentiating circuit 108.

Figure 7A:
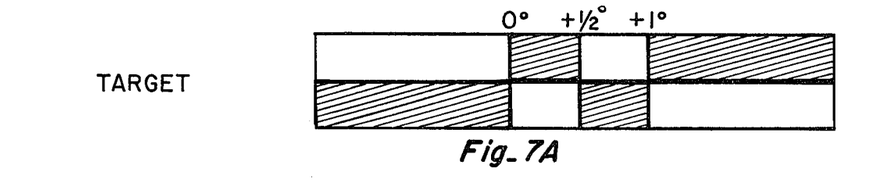
FIGS. 7A–7H illustrate a signal waveform timing diagram showing the generation of the target signal and target pulses.
Figure 7B:
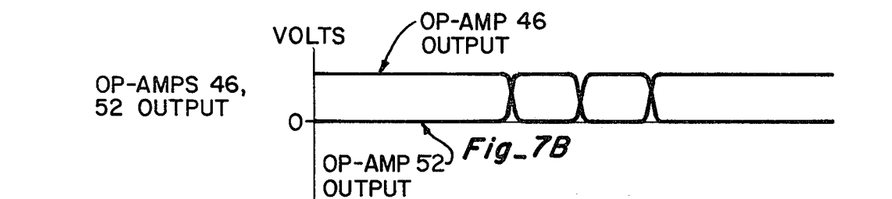
Figure 7C:
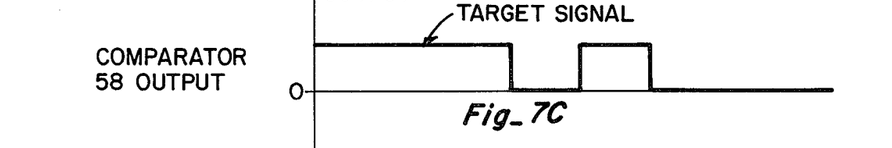
Figure 7D:
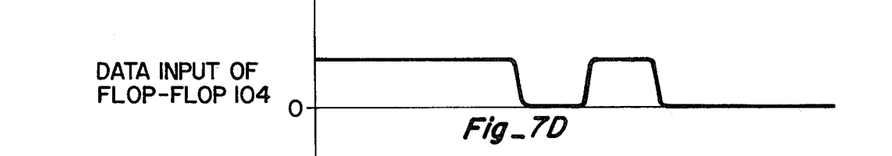
Figure 7E:
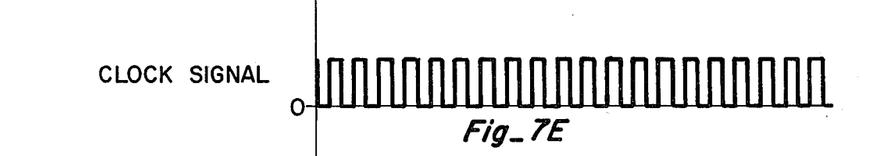
Figure 7F:
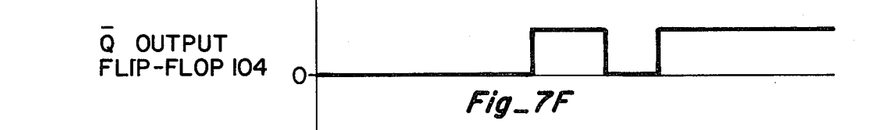
Figure 7G:
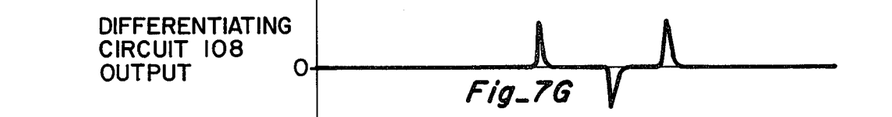
Figure 7H:
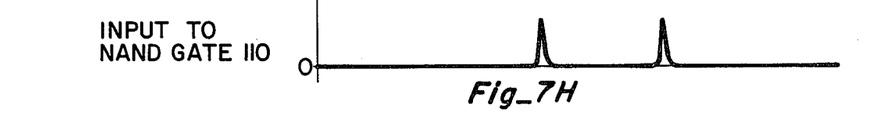

As illustrated in FIGS. 7A, 7C, and 7D, the target signal changes in magnitude at zero degrees, a positive one-half degree, and a positive one degree. The clock pulse gates the target signal, including the signal level change at these preestablished wheel angles, to the flip-flop 104 output. The output of the differentiating circuit 108 is an impulse signal each time the target signal changes state, as illustrated by FIGS. 7D-7G. The impulse signal from the differentiating circuit 108 is applied to NAND gate 110 after diode 112 removes the negative going impulse which occurs at a positive one-half degree toe angle or camber angle, as seen in FIG. 7H. The occurrence of the zero degree and positive one degree target impulse signals are used to control the checking circuit 22 and enabling circuit 28. Although the $\overline{Q}$ output is gated to differentiating circuit 108, it is understood that the Q output could be used instead. In the embodiment in which the $\overline{Q}$ output is connected to the differentiating circuit 108, when the monitored wheel aligning apparatus 10 moves from a toe out or negative camber angle position to a toe in or positive camber angle position, the impulse signal is in a positive sense at zero degrees and a positive one degree. As a consequence, these impulse signals are applied to NAND gate 110. When the monitored wheel aligning apparatus 10 moves from a toe in or positive camber angle position to a toe out or negative camber angle position, the impulse signals are then in a negative sense at zero degrees and a positive one degree. As a consequence, these impulse signals are now removed by diode 112. Although the impulse signal associated with the positive one-half degree position is now a positive going impulse, it is not gated through NAND gate 110 because the output of comparator 96 is a logic LOW at this time. The positive going impulse for the zero degree and positive one degree positions then are generated only when the monitored wheel aligning apparatus 10 is moving in a first direction and not in a second or opposite direction.

Conversely, in the embodiment in which the Q output is connected to the differentiating circuit 108, when the monitored wheel aligning apparatus 10 moves from a toe out or negative camber angle position to a toe in or positive camber angle position, the impulse signal is in a negative sense at zero degrees and a positive one degree. On the other hand, when the monitored wheel aligning apparatus 10 moves from a toe in or positive camber angle position to a toe out or negative camber angle position, the impulse signal is in a positive sense at zero degrees and a positive one degree. In this embodiment, therefore, the positive going impulse signals for the zero degree and positive one degree positions are generated only when the monitored wheel aligning apparatus 10 is moving in the second direction.

Figure 8H:
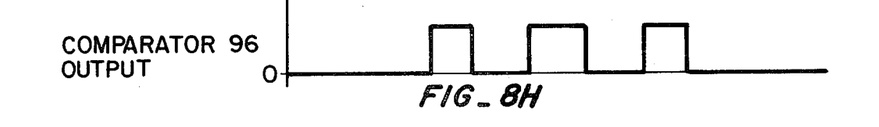

NAND gate 110 is also responsive to the output of comparator 96. Normally, the output of NAND gate 110 is a logic HIGH since the impulse signals indicating that the monitored wheel aligning apparatus 10 is at zero degrees or a positive one degree are not present. In addition, the output of comparator 96 is usually a logic LOW until the angle signals, representing the toe or camber of the wheel being measured, provide a voltage within predetermined limits of the voltage corresponding to zero degrees or a one degree toe or camber, as seen in FIG. 8H. Each time this occurs, a logic HIGH is applied to one of the inputs of NAND gate 110. When the logic HIGH impulse signal is also inputted to the NAND gate 110, the NAND gate 110 changes state to a logic LOW. This logic LOW is applied to NAND gate 114 which outputs a logic HIGH. This logic HIGH changes the output state of NAND gate 116 to a logic LOW. The logic HIGH output of NAND gate 114 is also applied to NAND gate 118. The output of NAND gate 118 remains a logic HIGH since the zero hold and range hold inputs are normally a logic LOW. The zero and range hold inputs will be more fully explained later. Since the voltage across capacitor 120 cannot change instantaneously, when the output of NAND gate 116 becomes a logic LOW the logic HIGH output of NAND gate 118 charges capacitor 120. When capacitor 120 reaches the voltage level of a logic HIGH, NAND gate 114 again changes state to a logic LOW since the target impulse signal is no longer present at the input of NAND gate 110. As a result of the foregoing logic circuits, NAND gate 114 outputs a positive going target pulse of 25 millisecond duration whenever the target impulse signals are present while the output of NAND gate 116 is a negative going target pulse of 25 millisecond duration.

Figure 5:
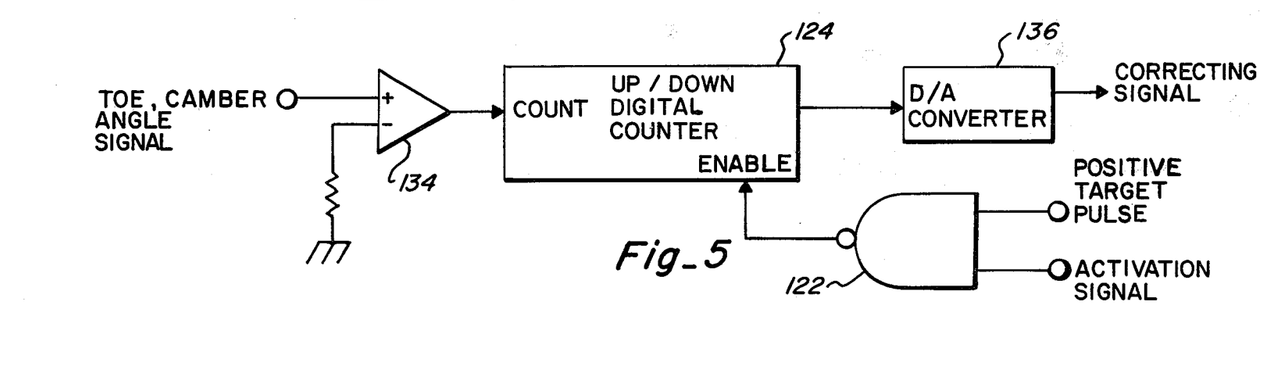
FIG. 5 is a schematic illustration of the adjusting circuit.

The positive going target pulse from NAND gate 114 is applied to one of the inputs of NAND gate 122 of adjusting circuit 24, as seen in FIG. 5. The output of NAND gate 122 is normally a logic HIGH which inhibits up/down digital counter 124. If the positive going target pulse from NAND gate 114 is present and if the output of comparator 92 of control circuit 20 is a logic HIGH indicating that the angle signal is within 25% of the range point voltage, NAND gate 122 switches states to a logic LOW. The fact that the output of comparator 92 is a logic HIGH indicates that a zero target pulse is present. This logic LOW signal enables the up/down digital counter 124. At the same time the positive going target pulse is applied to NAND gate 122, the negative going target pulse from NAND gate 116 of control circuit 20 is applied to NAND gate 126 of the checking circuit 22, as seen in FIG. 3. When the negative going target pulse is present, the output of NAND gate 126 is a logic HIGH. The NAND gate 126 output controls the sample and hold circuit 78. The sample and hold circuit 78 includes a switch 128 which opens when a logic HIGH is outputted from NAND gate 126. During the period when no target pulse is inputted to NAND gate 126, clock 130, which outputs the clock signal illustrated in FIG. 7E, controls the opening and closing of the switch 128. The switch 128 gates the angle signal from the integrating network 68 after amplification by amplifying network 76, as previously discussed.

When a target pulse is present indicative of the monitored wheel aligning apparatus 10 positioned such that the toe angle or camber angle of the wheel is at zero degrees or a positive one degree, the switch 128 is opened so that the angle signal then present from the transducer 12 is held on capacitor 132. Since the target pulse is 25 milliseconds in duration, the capacitor 132 holds the angle signal input to the voltage follower 80 for 25 milliseconds. The output of voltage follower 80 is applied to the summing amplifier 82. The angle signal is summed with a correcting signal from the adjusting circuit 24 to provide a corrected angle signal which is sent to a meter display 26. The meter display 26 provides a visual read-out of the toe angle or camber angle of the wheel being tested.

Referring again to the adjusting circuit 24 of FIG. 5 to discuss the generation of the correcting signal, it is seen that the toe angle or camber angle signal is inputted to the non-inverting terminal of comparator 134. The output of comparator 134 is applied to the up/down digital counter 124. As previously described, up/down digital counter 124 is enabled whenever a logic LOW is applied thereto from NAND gate 122. When up/down digital counter 124 is enabled, it begins counting in a positive direction if the output of comparator 134 is a logic HIGH. If the output of comparator 134 is a logic LOW, up/down digital counter 124 counts in a negative direction. Since the inverting terminal of comparator 134 is essentially at zero volts, digital counter 124 counts whenever the angle signal is different than zero volts. As a consequence, the digital counter 124 outputs a digital count corresponding to the difference between the reference voltage of zero volts, which is applied to the inverting terminal of comparator 134, and the actual magnitude of the angle signal, which is applied to the non-inverting terminal of comparator 134 from the output of the summing amplifier 82.

The digital counter 124 output is sent to a digital-to-analog (D/A) converter 136 which outputs an analog correcting signal. The correcting signal, as previously noted, is summed with the angle signal provided by the transducers 12 so that the angle signal becomes zero volts. A zero volt angle signal output corresponds to a zero degree toe or camber in the preferred embodiment. It is readily understood that if an angle signal of zero volts is not present when the zero target pulse occurs, the correcting signal adjusts the angle signal so that it does provide an indication of zero degrees to the meter display 26. In addition, the correcting signal remains constant until the next occurrence of the zero target pulse. Hence, the same correcting signal continues to adjust the angle signal from the transducer 12 during the entire sweep of the monitored wheel aligning apparatus 10. It is also readily appreciated that the range target pulse, which occurs at a positive one degree toe or camber, does not change the magnitude of the correcting signal. The activation signal to NAND gate 122 is a logic LOW when the range target pulse is present so that the up/down digital counter 124 is not enabled.

Additional circuitry is also provided which enables an operator of the apparatus to hold the value of the toe angle or camber angle on the meter display 26 when the zero target pulse or range target pulse is present. Referring to the control circuit 20 of FIG. 4, a range hold signal is inputted to NAND gate 118. Assuming that no target pulse is then present, the output of NAND gate 118 remains a logic HIGH. When a range target pulse occurs, the output of NAND gate 110 becomes a logic LOW. The output of NAND gate 114 becomes a logic HIGH. The output of NAND gate 116 becomes a logic LOW. The output of NAND gate 118 also becomes a logic LOW since both inputs thereto are a logic HIGH. The logic LOW output of NAND gate 118 holds the outputs of NAND gates 114, 116 at a logic HIGH and a logic LOW, respectively. The logic LOW from NAND gate 116 is gated to the NAND gate 126 of the checking circuit of FIG. 3 so that the output thereof is held at a logic HIGH. This logic HIGH holds the switch 128 open so that the angle signal then present is held on capacitor 132 and applied to summing amplifier 82. Consequently, meter display 26 continues to display the same angle signal.

It is readily seen in FIG. 4 that the range hold signal also acts to inhibit the generation of a zero target pulse. The range hold signal is applied to the NAND gate 102. As a consequence, when the output of comparator 96 becomes a logic HIGH indicating that the angle signal is within 25% of the range point voltage or approaching the zero degree mark, a logic LOW is outputted from the NAND gate 102. This logic LOW inhibits the gating of the zero degree impulse through NAND gate 110.

Similarly, when it is desirable to hold the reading on the meter display 26 which represents the toe angle or camber angle at the occurrence of the zero target pulse, the zero hold signal of the control circuit 20 is switched from a logic LOW to a logic HIGH. When the zero target impulse is present at the input of NAND gate 110, the logic HIGH output from NAND gate 114 and the logic HIGH output of the zero hold signal switch the output of NAND gate 118 to a logic LOW so that the target pulse outputs of NAND gates 114, 116 remain at a logic HIGH and a logic LOW, respectively.

Figure 6:
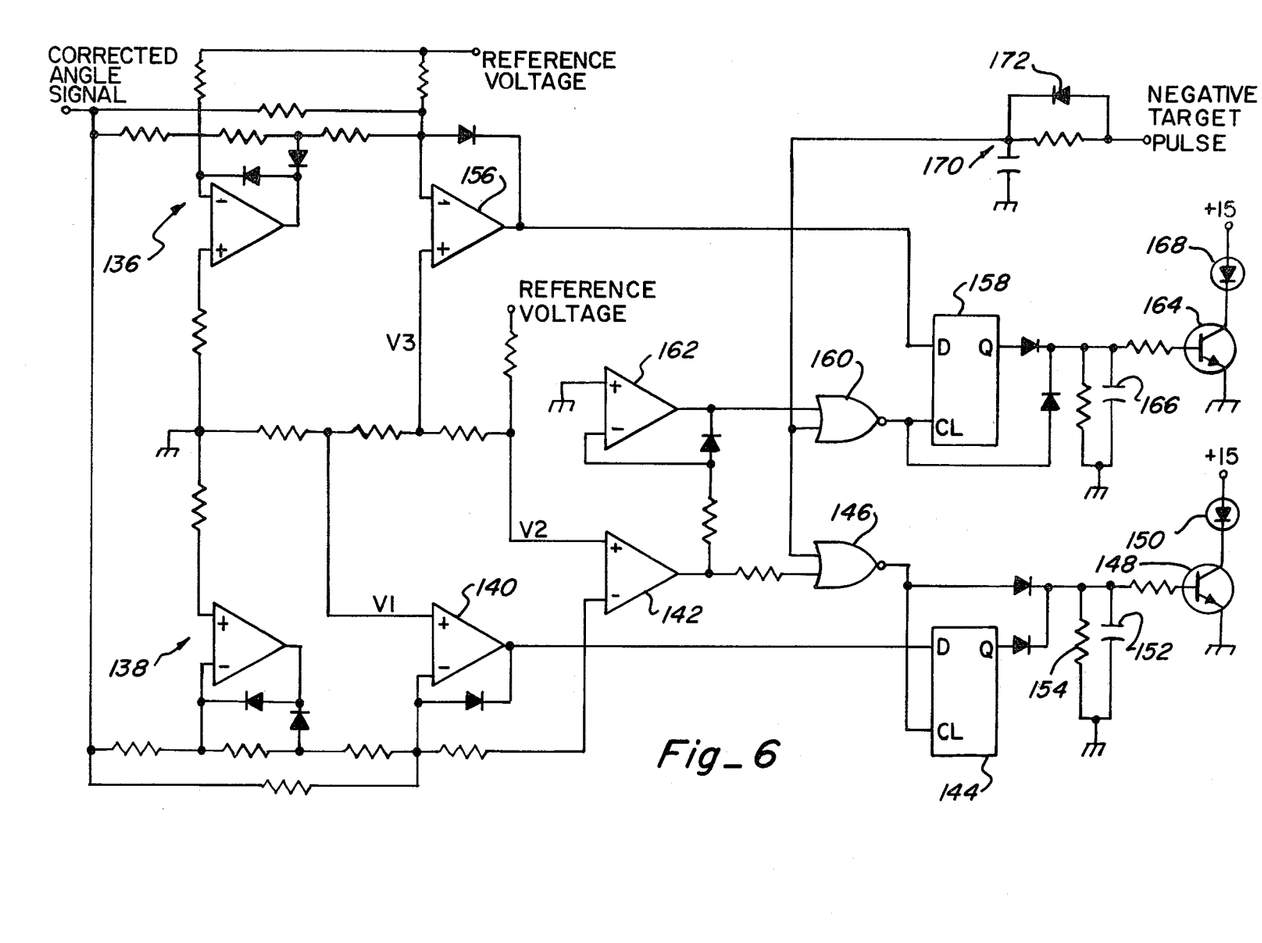
FIG. 6 is a schematic showing the enabling circuit and LED indicators.

In the preceding discussion, it was assumed that the target impulse signals, representative of the fact that the monitored wheel aligning apparatus 10 was positioned at a zero degree or a positive one degree toe or camber, occurred when the corrected angle signal corresponded to zero degrees or a positive one degree toe or camber, If the corrected angle signal does not correspond, an indication is provided by enabling circuit 28. The enabling circuit 28 provides a visual indication of whether the corrected angle signal properly corresponds to the actual position of the wheel aligning apparatus 10 at zero degrees and a positive one degree toe or camber. Referring to FIG. 6, the enabling circuit includes full wave rectifying circuits 136, 138. Inputted to each rectifying circuit 136, 138 is the corrected angle signal output of summing amplifier 82 of FIG. 3. The output of rectifying circuit 138 is an essentially V-shaped ramp signal corresponding to the displacement of the wheel aligning apparatus 10. The ramp signal has a negative polarity and is applied to the inverting terminal of comparator 140. A first reference voltage V1 is applied to the non-inverting terminal of comparator 140. The first reference voltage V1 is selected to be a negative voltage just less than zero volts so that the comparator 140 output is usually a logic HIGH. When the corrected angle signal corresponds to zero degrees toe or camber, the output of comparator 140 becomes a logic LOW. The output of rectifying circuit 136 is also sent to the non-inverting terminal of comparator 142. A second reference voltage V2 is applied to the non-inverting terminal of comparator 142. V2 is a negative voltage greater than V1 in absolute magnitude. As a consequence, the output of comparator 142 becomes a logic LOW prior to the output of comparator 140 changing from a logic HIGH to a logic LOW when the corrected angle signal approaches a value corresponding to zero degrees.

The output signal of comparator 140 communicates with the data input of the "D" flip-flop 144. The output of NOR gate 146 is applied to the clock input of the flip-flop 144. Each time the clock input rises, the data line input is gated to the Q output of the flip-flop 144. The Q output controls the biasing of transistor 148 which in turn acts as a switch in turning light emitting diode (LED) or indicator 150 on and off. NOR gate 146 has two inputs. The first input is the output of comparator 142. The second input is provided by the negative going target pulse from NAND gate 116 of control circuit 20. Whenever the target signal is a logic HIGH indicating that the wheel aligning apparatus 10 is not at zero degrees or a positive one degree, the second input to NOR gate 146 is a logic HIGH. The output of NOR gate 146 is then a logic LOW. While this output is a logic LOW, the output then present at Q of flip-flop 144 controls the state of LED 150. When the corrected angle signal approaches a value corresponding to zero degrees, the output of comparator 142 becomes a logic LOW. When the zero target pulse occurs, the NOR gate 146 changes state from a logic LOW to a logic HIGH. This logic HIGH charges capacitor 152. Upon charging to a predetermined voltage, transistor 148 is turned on. LED 150 is then provided with a current path. This change in state is also applied to the clock input of flip-flop 144 which causes the data input to be gated to the Q output of flip-flop 144. If the data input is a logic LOW indicating that the corrected angle signal is substantially equal to a value corresponding to zero degrees, the Q output is a logic LOW. As a consequence, after the zero target pulse is no longer present and the output of NOR gate 146 becomes a logic LOW, capacitor 152 discharges through resistor 154. Upon sufficient discharge or approximately 50 milliseconds later, transistor 148 is cut off and LED 150 is no longer lit. Therefore, a flashing LED 150 indicates proper calibration. If, on the other hand, the data input to flip-flop 144 is a logic HIGH, indicating that the corrected angle signal is not equal to a value corresponding to zero degrees, the zero target pulse causes the logic HIGH to be gated to the Q output of flip-flop 144. The logic HIGH holds transistor 148 on so that LED 150 stays lit. A continually lit LED 150 indicates improper calibration. The operator is then on notice of a fault being present that must be corrected.

Rectifying circuit 136 is provided to monitor the presence of the range point of a positive one degree. In addition to receiving the corrected angle signal, the rectifying circuit 136 also responds to a reference voltage input. The reference voltage is chosen such that the sum of the reference voltage and the corrected angle signal corresponding to one degree substantially equals zero volts in the preferred embodiment. This voltage sum is applied to the inverting terminal of comparator 156. A third reference voltage V3 is applied to the non-inverting terminal of comparator 156. V3 is a negative voltage just less than zero volts. Consequently, the output of comparator 156 is a logic HIGH until the corrected angle signal approaches the voltage corresponding to one degree. The output of comparator 156 is sent to the data line of the "D" flip-flop 158. The clock input of flip-flop 158 responds to the output of NOR gate 160. A first input to NOR gate 160 is the output of comparator 162. The output of comparator 162 responds to the output of comparator 142. If the output of comparator 142 is a logic HIGH, the first input to NOR gate 160 is a logic LOW. Hence, when a range target pulse is applied to the second input of NOR gate 160, the output thereof becomes a logic HIGH. However, when a zero target pulse is applied thereto, the output of NOR gate 160 remains a logic LOW since the output of comparator 160 is a logic HIGH.

If the range target pulse is present, the clock signal gates the data input signal to the Q output of flip-flop 158. The output of NOR gate 160 also turns on transistor 164 after sufficiently charging capacitor 166. Upon turning on, transistor 164 provides a current path for LED 168. If the data input signal is a logic LOW when the clock signal rises, this logic LOW turns off transistor 164 after capacitor 166 has sufficiently discharged. The flashing LED 168 indicates that the fault detecting and calibrating apparatus is properly calibrated at the range point. If the data input signal is a logic HIGH when the clock signal rises, the LED 168 remains lit. The continually lit LED 168 provides an indication that the fault detecting and calibrating apparatus is not properly calibrated at the range point. It is also understood, if no range target pulse or zero target pulse is generated, that LEDs 150, 168 will remain continuously turned off. The zero and range target pulses may not be generated because the angle signals inputted to comparators 88, 90, 92 are not within the predetermined tolerances for providing the windows of FIG. 8H when the impulse signals are present. As a consequence, an operator is put on notice that the calibration errors are even greater than when the LEDs 150, 168 are continuously lit.

The enabling circuit 28 further includes a delay circuit 170. The delay circuit 170 responds to each target pulse which is inputted to the enabling circuit 28. The delay circuit 170 delays the target pulse a predetermined time period so that the angle signal is adjusted by the correcting signal before the clock signal gates the data input signal to the Q output of flip-flops 144, 158. As a result of this time delay, the angle signal after correction, rather than before correction, is checked to determine whether it corresponds to the position of the wheel aligning apparatus 10. Diode 172 acts as a shunt for the target pulse signal when the target pulse is no longer present so that the change of state of the target signal from a logic LOW to a logic HIGH is immediately applied to NOR gates 146, 160.

Based on the foregoing description, a number of advantages of the present invention are readily discerned. A fault detecting and automatic calibrating apparatus is provided which minimizes the effects of signal drifts by providing a balancing photosensor circuit. The calibrating apparatus is used in combination with a monitored apparatus for minimizing inaccuracies in the display or recording of measured data. The calibrating apparatus checks itself at two different positions of the monitored apparatus. If there is a lack of correspondence at a first preestablished position, the calibrating apparatus adjusts itself to provide the correct output. If there is a lack of correspondence at a second preestablished position, a visual indication is given that the calibrating apparatus is improperly calibrated.

In the embodiment for use with a wheel aligning apparatus, the fault detecting and automatic calibrating apparatus responds to signals corresponding to toe or camber angles of a wheel being tested. A target is connected to the wheel aligning apparatus such that, when the wheel aligner is at a zero degree position or a positive one degree position, a change in a target signal is generated. At each of these positions, a check is made as to whether the automatic calibrating apparatus output corresponds to the actual position of the wheel aligner. If a corrected angle signal from the calibrating apparatus does not correspond to the positive one degree position, a visual indication is provided to inform an operator that the calibrating apparatus is not properly calibrated. If there is a lack of correspondence between the angle signal output of the calibrating apparatus and a predetermined output corresponding to zero degrees, the angle signal is corrected so that it corresponds to the actual position of the wheel aligner. If the corrected angle signal does not correspond to the zero degrees position, a visual indication is provided to inform the operator that the calibrating apparatus is not properly calibrated. Consequently, accuracy in aligning the front wheel suspension system of a vehicle is maximized. Furthermore, uncertainty and errors in the measuring and recording of the various pertinent wheel angles are minimized.

The invention has been described in detail with reference to a particular embodiment thereof, but it is understood that variations and modifications can be effected within the spirit and scope of this invention. It is also understood that the above described invention could be implemented, in total or in part, by means of appropriate microprocessor circuits and instructions.

We claim:

1. A calibration fault detecting and automatic calibrating apparatus for observing the position of a monitored apparatus which varies in position, comprising:
   first means for producing a first signal corresponding to the position of the monitored apparatus;
   second means for generating a second signal indicating that the monitored apparatus is at a first preestablished reference position, said second means including reference means having target means, said target means being connected to the monitored apparatus and movable therewith, said reference means further having means communicating with said target means for producing an input to said target means, the input being used by said target means for providing an output to said means for producing, the output being used in generating the second signal; and
   third means responsive to said first means and said second means, said third means including means for generating a predetermined output representing the first preestablished reference position of the monitored apparatus and also including means for determining whether the first signal corresponds to the predetermined output, this determination being made when the monitored apparatus is at the first preestablished reference position to determine whether the automatic calibrating apparatus is correctly calibrated.

2. The apparatus, as claimed in claim 1, further including:
   means responsive to said third means for adjusting the first signal when said third means determines that the automatic calibrating apparatus is improperly calibrated.

3. The apparatus, as claimed in claim 2, further including:
   means responsive to said second means for indicating whether the automatic calibrating apparatus is correctly calibrated.

4. The apparatus, as claimed in claim 3, wherein:
   said indicating means provides an indication of whether the automatic calibrating apparatus is properly calibrated after the first signal has been adjusted by said adjusting means.

5. The apparatus, as claimed in claim 1, wherein:
   said means for producing includes at least one sensor alignable with said target means for generating an output signal indicating whether the monitored apparatus is at the first preestablished reference position.

6. The apparatus, as claimed in claim 5, wherein:
   said target means includes a first transition point formed thereon such that, when said sensor is substantially across from said target means at the first transition point, the output signal of said sensor changes magnitude to provide an indication that the monitored apparatus is at the first preestablished reference position.

7. The apparatus, as claimed in claim 1, wherein:
   said reference means includes a pair of sensors positioned adjacent each other, and said target means includes a first transition point formed thereon, each of said sensors being substantially across from the first transition point of said target means when the monitored apparatus is at the first preestablished reference position, the output signals of said sensors changing in opposite directions when the monitored apparatus is at the first preestablished reference position.

8. The apparatus, as claimed in claim 2, wherein:
   said second means includes means for controlling said adjusting means so that said adjusting means is enabled when the monitored apparatus is at the first preestablished reference position.

9. The apparatus, as claimed in claim 2, wherein:
   said adjusting means outputs a correcting signal corresponding to the difference between the magnitude of the first signal and the magnitude of the predetermined output.

10. The apparatus, as claimed in claim 9, wherein:
    'the magnitude of the correcting signal changes only when the monitored apparatus is at the first preestablished reference position.

11. The apparatus, as claimed in claim 1, wherein:
    said second means produces a third signal indicating that the monitored apparatus is at a second preestablished reference position different than the first preestablished reference position.

12. The apparatus, as claimed in claim 11, wherein:
    the second and third signals generated by said second means occur at different times but are substantially equal in magnitude.

13. A calibration fault detecting and automatic calibrating apparatus for observing the position of a monitored apparatus which varies in position, comprising:
    means responsive to a movable monitored apparatus for sensing the position of the monitored apparatus and providing a first signal corresponding to the position of the monitored apparatus;

reference means responsive to the monitored apparatus and including target means for generating a target signal to indicate whether the monitored apparatus is at a first preestablished reference position, said target means being connected to the monitored apparatus and movable therewith;

means for generating a predetermined output representing a first preestablished reference position of the monitored apparatus;

means responsive to said means for sensing and said means for generating for checking the first signal to determine whether the first signal corresponds to the predetermined output when the monitored apparatus is positioned at the first preestablished reference position;

means responsive to said checking means for adjusting the first signal when there is a lack of correspondence between the first signal and the predetermined output so that, when the monitored apparatus is at the first preestablished reference position, the first signal corresponds to the predetermined output; and means responsive to said reference means for controlling said adjusting means so that said adjusting means is enabled when the monitored apparatus is at the first preestablished reference position.

14. The apparatus, as claimed in claim 13, further including:

means responsive to said checking means for indicating whether the first signal corresponds to the predetermined output when the monitored apparatus is at the preestablished reference position.

15. The apparatus, as claimed in claim 14, wherein:

said indicating means includes means for delaying the target signal so that said indicating means indicates whether the automatic calibrator is correctly calibrated after the first signal is adjusted by said adjusting means.

16. The apparatus, as claimed in claim 13, wherein:

the target signal indicates whether the monitored apparatus is at a second preestablished reference position different than the first preestablished reference position.

17. The apparatus, as claimed in claim 16, wherein:

the target signal changes in magnitude when the monitored apparatus is at the first preestablished reference position and the second preestablished reference position, the change in magnitude of the target signal being in the same sense at the first preestablished reference position and the second preestablished reference position.

18. The apparatus, as claimed in claim 13, wherein:

said controlling means generates a target pulse each time the monitored apparatus is at the first preestablished reference position and the monitored apparatus is moving in a first direction while the generation of the target pulse is inhibited when the monitored apparatus is moving in a second direction opposite of the first direction.

19. The apparatus, as claimed in claim 13, wherein:

said target means includes a target having a surface of relatively high light reflection and a surface of relatively low light reflection adjacent to the high light reflecting surface.

20. A method for detecting and correcting a fault in a first apparatus which monitors a movable second apparatus, comprising the steps of:

establishing a predetermined output representing a first preestablished reference position of the second apparatus;

generating a first signal corresponding to the position of the second apparatus;

producing a second signal which indicates that the second apparatus is at the first preestablished reference position;

determining whether the first signal corresponds to the predetermined output when the second signal is present; and adjusting the first signal when there is a lack of correspondence between the predetermined output and the first signal.

21. The method, as claimed in claim 20, further including the step of:

indicating whether the first signal corresponds to the predetermined output after adjustment of the first signal.

22. The method, as claimed in claim 20, further including the step of:

producing a third signal which indicates that the second apparatus is at a second preestablished reference position different than the first preestablished reference position.

23. A method for detecting and correcting a fault in a first apparatus which monitors a movable second apparatus, comprising the steps of:

establishing a predetermined output representing a preestablished reference position of the second apparatus;

generating a first signal corresponding to the position of the second apparatus;

producing a second signal which indicates that the second apparatus is at the first preestablished reference position;

determining whether the first signal corresponds to the predetermined output when the second signal is present and the second apparatus is positioned at the first preestablished reference position;

providing a correcting signal corresponding to the difference between the predetermined output and the first signal when the second signal is present; and adjusting the first signal with the correcting signal so that a correspondence between the predetermined output and the first signal results.

24. The method, as claimed in claim 23, wherein:

the magnitude of the correcting signal changes only when the second signal is present.

25. A method for detecting and correcting a fault in a first apparatus which monitors a second apparatus which moves in a first direction and a second direction, comprising the steps of:

establishing a predetermined output representing a first preestablished reference position of the second apparatus;

generating a first signal corresponding to the position of the second apparatus;

producing a second signal, which indicates that the second apparatus is positioned at the first preestablished reference position, when the second apparatus is moving in the first direction but not if the second apparatus is moving in the second direction;

adjusting the first signal when there is a lack of correspondence between the predetermined output and the first signal when the second signal is present.

* * * * *

UNITED STATES PATENT AND TRADEMARK OFFICE
CERTIFICATE OF CORRECTION

PATENT NO. : 4,442,696
DATED : April 17, 1984
INVENTOR(S) : Lowell H. Erickson, Marcellus S. Merrill It is certified that error appears in the above—identified patent and that said Letters Patent is hereby corrected as shown below:

In the Claims, Column 18, line 29, "1" should read --5--. In line 30, the word "reference" should be deleted and after the word "means" the words should be inserted --for producing--.

Signed and Sealed this

Nineteenth Day of February 1985

[SEAL]

Attest:

DONALD J. QUIGG

Attesting Officer    Acting Commissioner of Patents and Trademarks